United States Patent
Xi et al.

(10) Patent No.: US 12,133,056 B2
(45) Date of Patent: Oct. 29, 2024

(54) DISPLAY DEVICE, SOUND PRODUCING CONTROL METHOD, PARAMETER DETERMINING METHOD AND DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yanhui Xi, Beijing (CN); Xiaomang Zhang, Beijing (CN); Wenchao Han, Beijing (CN); Yaqian Ji, Beijing (CN); Wei Sun, Beijing (CN); Minglei Chu, Beijing (CN); Xiangjun Peng, Beijing (CN); Tiankuo Shi, Beijing (CN); Zhihua Ji, Beijing (CN); Yan Sun, Beijing (CN); Yifan Hou, Beijing (CN); Chenxi Zhao, Beijing (CN); Shuo Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 279 days.

(21) Appl. No.: 17/619,923

(22) PCT Filed: Feb. 7, 2021

(86) PCT No.: PCT/CN2021/075745
§ 371 (c)(1),
(2) Date: Dec. 16, 2021

(87) PCT Pub. No.: WO2022/165788
PCT Pub. Date: Aug. 11, 2022

(65) Prior Publication Data
US 2023/0156402 A1    May 18, 2023

(51) Int. Cl.
*H04R 3/04* (2006.01)
*H04R 1/02* (2006.01)
(Continued)

(52) U.S. Cl.
CPC ............... *H04R 3/04* (2013.01); *H04R 1/028* (2013.01); *H04R 1/227* (2013.01); *H04R 1/403* (2013.01);
(Continued)

(58) Field of Classification Search
None
See application file for complete search history.

(56) References Cited

U.S. PATENT DOCUMENTS

| | | | |
|---|---|---|---|
| 2011/0176696 A1* | 7/2011 | Kasargod | H03G 5/04 381/98 |
| 2018/0103306 A1* | 4/2018 | Pellikka | H04R 1/026 |

(Continued)

FOREIGN PATENT DOCUMENTS

| | | |
|---|---|---|
| CN | 102915741 A | 2/2013 |
| CN | 108646971 A | 10/2018 |

(Continued)

OTHER PUBLICATIONS

First Office Action for Chinese Application No. 202180000202.4, dated Mar. 23, 2024, 8 Pages.

*Primary Examiner* — James K Mooney
(74) *Attorney, Agent, or Firm* — Brooks Kushman P.C.

(57) ABSTRACT

A display device, a sound producing control method, a method and device for determining parameters. The display device includes a plurality of exciters arranged on the display panel, the display panel producing sound on a screen through the plurality of exciters; wherein, the plurality of the exciters are formed as at least one sound producing unit, each sound producing unit includes at least two exciters, and (Continued)

each exciter in the same sound producing unit is connected to a same audio signal input end, in one sound producing unit, a signal filter is provided on an audio transmission line from the audio signal input end to at least one exciter, and used for low frequency compensation of a sound produced by the entire sound producing unit.

13 Claims, 9 Drawing Sheets

(51) Int. Cl.
    *H04R 1/22*     (2006.01)
    *H04R 1/40*     (2006.01)
    *H04R 3/12*     (2006.01)

(52) U.S. Cl.
    CPC ......... *H04R 3/12* (2013.01); *H04R 2201/401* (2013.01); *H04R 2499/15* (2013.01)

(56) References Cited

U.S. PATENT DOCUMENTS

| | | | |
|---|---|---|---|
| 2020/0107115 A1* | 4/2020 | Son | H04R 1/22 |
| 2020/0204135 A1 | 6/2020 | Qin et al. | |
| 2020/0310736 A1* | 10/2020 | Pastrik | G06F 1/1605 |
| 2021/0006880 A1 | 1/2021 | Yan et al. | |
| 2023/0354712 A1* | 11/2023 | Ohashi | H04R 3/14 |

FOREIGN PATENT DOCUMENTS

| | | |
|---|---|---|
| CN | 109189360 A | 1/2019 |
| CN | 109194796 A | 1/2019 |
| CN | 109195050 A | 1/2019 |
| CN | 109240413 A | 1/2019 |
| CN | 104853279 B | 6/2019 |
| CN | 110018808 A | 7/2019 |
| CN | 110049421 A | 7/2019 |
| CN | 210805037 U | 6/2020 |
| CN | 111836165 A | 10/2020 |
| CN | 112102717 A | 12/2020 |
| KR | 20190052820 A | 5/2019 |

* cited by examiner

DISPLAY DEVICE, SOUND PRODUCING CONTROL METHOD, PARAMETER DETERMINING METHOD AND DEVICE

CROSS-REFERENCE TO RELATED APPLICATION

This application is the U.S. national phase of PCT Application No. PCT/CN2021/075745 filed on Feb. 7, 2021, which is incorporated herein by reference in its entirety.

TECHNICAL FIELD

The present disclosure relates to the field of display technology, and more particularly to a display device, a sound producing control method, a parameter determining method and device.

BACKGROUND

The display device can realize the integration of sound and picture through direct sound production on the screen, and can effectively use space and save resources. In addition, when combined with a large-size screen, the sound power can be increased and different sound field effects can be achieved.

The use of screen sound producing technology requires the exciter to be attached to the back of the display screen. The display screen replaces the diaphragm in the speaker. The exciter vibrates, and drives the screen to vibrate, and pushes the airflow to produce sound. Usually, in order to realize the integration of sound and picture, each sub-screen spliced to form the display screen is fitted with an exciter to form an on-screen speaker array structure, and the speaker array is used to achieve the effect of sound source positioning or directional sound production.

However, the sound producing device with this structure has the problem of poor low frequency performance of the full-frequency exciter, and the uniformity and flatness of the frequency spectrum of the speaker of the sound producing device cannot be guaranteed.

SUMMARY

The objective of the disclosed solution is to provide a display device, a sound producing control method, a method and device for determining parameters, so that the problems of poor low frequency performance, non-guaranteed spectral uniformity and good flatness of the conventional screen sound producing technology is solved.

In order to solved the above technical problem, a display device includes a display panel and a plurality of exciters arranged on the display panel, the display panel producing sound on a screen through the plurality of exciters; wherein, the plurality of the exciters are formed as at least one sound producing unit, each sound producing unit includes at least two exciters, and each exciter in the same sound producing unit is connected to a same audio signal input end, in one sound producing unit, a signal filter is provided on an audio transmission line from the audio signal input end to at least one exciter, and used for low frequency compensation of a sound produced by the entire sound producing unit.

Optionally, the plurality of the exciters are formed as at least two sound producing units, and exciters in different sound producing units are connected to different audio signal input ends.

Optionally, in the same sound producing unit, no signal filter is provided on the audio transmission line from a first exciter of the at least two exciters to the audio signal input end, and an audio signal at the audio signal input end is directly transmitted to the first exciter, and the first exciter vibrates and produces sound; a low-pass filter is provided on an audio transmission line from each second exciter of at least two exciters other than the first exciter, and the audio signal at the audio signal input end passes through the low-pass filter, so that a low frequency signal of the audio signal is obtained and transmitted to the second exciter, and the second exciter vibrates and produces sound.

Optionally, in the same sound producing unit, a low-pass filter is provided on the audio transmission line from a first exciter of the at least two exciters to the audio signal input end, an audio signal at the audio signal input end passes through the low-pass filter, a low frequency signal of the audio signal is obtained and transmitted to the first exciter, and the first exciter vibrates and produces sound; the low-pass filter is provided on a first audio transmission line from a second exciter of the at least two exciters other than the first exciter to the audio signal input end, and a high-pass filter is provided on a second audio line from the second exciter to the audio signal input end, and the audio signal at the audio signal input end passes through the low-pass filter to obtain a low frequency signal, passes through the high-pass filter to obtain a high frequency signal, and the low frequency signal and the high frequency signal are superimposed and transmitted to the second exciter, and the second exciter vibrates and produces sound.

Optionally, in the same sound producing unit, a low-pass filter and a high-pass filter are provided on the audio transmission line from the audio signal input end to each exciter, and an audio signal at the audio signal input end passes through the low-pass filter to obtain a low frequency signal, passes through the high-pass filter to obtain a high frequency signal, and the low frequency signal and the high frequency signal are superimposed, normalized and then transmitted to each exciter, the each exciter vibrates and produces sound.

Optionally, a number of the first exciters is at least two, audio transmission lines from the audio signal input end to the first exciters share one low-pass filter.

Optionally, the display panel comprises a plurality of sub-panels spliced in sequence, each sub-panel is provided with one exciter, wherein exciters arranged on a plurality of adjacent sub-panels are formed as one sound producing unit.

Optionally, the display panel comprises a plurality of display areas, each display area is provided with a plurality of exciters in an array, and a plurality of exciters arranged on each display area are formed as one sound producing unit.

An embodiment of the present disclosure provides a screen sound producing device, includes: a plurality of sound producing units arranged in an array, each sound producing unit including at least two exciters; a circuit board, provided with a plurality of audio input ends, wherein each audio input end corresponds to one sound producing unit, and the audio input end is connected to each exciter of the corresponding sound producing unit through an audio transmission line; in each sound producing unit, a signal filter is provided on the audio transmission line from the audio input end to at least one exciter.

Optionally, each sound producing unit further includes a plurality of display units arranged in an array, and each display unit is respectively provided with one exciter.

Optionally, display units of the plurality of sound producing units are formed as one display panel, or one display unit is formed as one display sub-panel, and adjacent display sub-panels are spliced together.

Optionally, in the same sound producing unit, no signal filter is provided on the audio transmission line from a first exciter of the at least two exciters to the audio signal input end; a low-pass filter is provided on the audio transmission line from each second exciter of the at least two exciters other than the first exciter to the audio signal input end.

Optionally, in the same sound producing unit, a low-pass filter is provided on the audio transmission line from a first exciter of the at least two exciters to the audio signal input end; the low-pass filter is provided on a first audio transmission line from a second exciter of the at least two exciters other than the first exciter to the audio signal input end; a high-pass filter is arranged on a second audio transmission line from the second exciter to the audio signal input end.

Optionally, in the same sound producing unit, a low-pass filter and a high-pass filter are provided in sequence on the audio transmission line from the audio signal input end to each exciter.

Optionally, the screen sound producing device further includes a processor for inputting an audio signal to each audio input end.

An embodiment of the present disclosure provides a sound producing control method, applied to the display device, the method includes: obtaining image information to be outputted and each audio signal corresponding to the image information; determining a sound producing unit when each audio signal is outputted according to the image information; inputting each audio signal to an audio signal input end of a corresponding sound producing unit, so that each exciter connected to the audio signal input end in the sound producing unit vibrates and produces sound in response to the same audio signal.

Optionally, determining a sound producing unit when each audio signal is outputted according to the image information includes: identifying a sound producing object corresponding to the audio signal in the image information; determining a display position of the sound producing object in the image information on the display panel when the display panel is displaying the image information; and determining the sound producing unit arranged at the display position to be used to output the audio signal.

An embodiment of the present disclosure provides a method for determining signal filtering parameters, applied to the display device, wherein the method includes: reading measured spectrum data; adjusting filtering parameters of a signal filter provided on the audio transmission line from the audio signal input end to each exciter in one sound producing unit according to the measured spectrum data, obtaining a set filtering parameter corresponding to each signal filter, so that through the set filtering parameter, when each exciter connected to the audio signal input end in the sound producing unit vibrates and produces sound in respond to the same audio signal, low frequency compensation is implemented for a sound produced by the entire sound producing unit.

Optionally, in the same sound producing unit, no signal filter is provided on the audio transmission line from a first exciter to the audio signal input end, and a low-pass filter is provided on the audio transmission line from each second exciter of at least two exciters other than the first exciter, the adjusting filtering parameters of a signal filter provided on the audio transmission line from the audio signal input end to each exciter in one sound producing unit according to the measured spectrum data, obtaining a set filtering parameter corresponding to each signal filter includes: in the case that filtering parameters of the low-pass filter corresponding to each second exciter are respectively initial filtering parameters, obtaining a first spectrum curve when the first exciter outputs a full audio signal of the measured spectrum data, a second spectrum curve when each exciter respectively outputs the full audio signal of the measured spectrum data, and a third spectrum curve when the first exciter outputs the full audio signal of the measured spectrum data, and N second exciters outputs a low frequency signal of the measured spectrum data; wherein N is a number of second exciters; adjusting the filtering parameters to obtain the set filtering parameter of the low-pass filter corresponding to each second exciter according to comparison results of the first spectrum curve, the second spectrum curve, and the third spectrum curve.

Optionally, the obtaining the third spectrum curve when the first exciter outputs the full audio signal of the measured spectrum data, and N second exciters output a low frequency signal of the measured spectrum data includes: calculating zero-state responses of the N second exciters according to the initial filtering parameters corresponding to the low-pass filters of each second exciter; superimposing the zero-state responses of the N second exciters and a spectrum curve of the measured spectrum data to generate the third spectrum curve.

Optionally, the initial filtering parameters include a filter type, an order, and a cut-off frequency; wherein the adjusting the filtering parameters includes: adjusting a cut-off frequency of each low-pass filter.

Optionally, adjusting the filtering parameters to obtain the set filtering parameter of the low-pass filter corresponding to each second exciter according to comparison results of the first spectrum curve, the second spectrum curve, and the third spectrum curve includes: comparing the first spectrum curve, the second spectrum curve and the third spectrum curve; when the first spectrum curve, the second spectrum curve, and the third spectrum curve do not meet a preset condition, adjusting the filtering parameters to re-obtain the first spectrum curve, the second spectrum curve, and the third spectrum curve; when the first frequency spectrum curve, the second frequency spectrum curve, and the third frequency spectrum curve meet the preset condition, obtaining the set filtering parameters of the low-pass filter corresponding to each second exciter.

Optionally, the preset condition is: a distance between a low frequency part of the third spectrum curve and the first spectrum curve is less than a first preset value, and a distance between a high frequency part of the third spectrum curve and the second spectrum curve is less than a second preset value, and a transition segment between the low frequency part and the high frequency part is a smooth segment.

An embodiment of the present disclosure provides a sound producing control device, applied to the display device, the device includes: a signal acquisition module, configured to acquire image information to be outputted and each audio signal corresponding to the image information; an analysis module, configured to determine a sound producing unit when each audio signal is outputted according to the image information; a signal transmission module, configured to input each audio signal to an audio signal input end of a corresponding sound producing unit, so that each exciter connected to the audio signal input end in the sound producing unit vibrates and produces sound in respond to the same audio signal.

An embodiment of the present disclosure provides a device for determining signal filtering parameters, applied to the display device, the device includes: a signal reading module, configured to read measured spectrum data; a data adjusting module, configured to adjust filtering parameters of a signal filter provided on the audio transmission line from the audio signal input end to each exciter in each sound producing unit according to the measured spectrum data, obtain a set filtering parameter corresponding to each signal filter, so that through the set filtering parameter, when each exciter connected to the audio signal input end in the sound producing unit vibrates and produces sound in respond to the same audio signal, low frequency compensation is implemented for a sound produced by the entire sound producing unit.

BRIEF DESCRIPTION OF THE DRAWINGS

In order to more clearly explain the technical solutions in the embodiments of the present disclosure or related technologies, the following will briefly introduce the drawings that need to be used in the description of the embodiments. Obviously, the drawings in the following description are only for some of the embodiments of the present disclosure. For those of ordinary skill in the art, other drawings can be obtained based on these drawings without creative work.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

In order to make the technical problems, technical solutions, and advantages to be solved by the present disclosure clearer, a detailed description will be given below in conjunction with the accompanying drawings and specific embodiments.

In order to solve the problem that the low frequency performance in the screen sound producing technology in the related art is poor, and the uniformity and good flatness of the frequency spectrum cannot be guaranteed, an embodiment of the present disclosure provides a display device, which uses at least two exciters to form a sound producing unit, the audio transmission line of at least one exciter in the sound producing unit is provided with a signal filter, so that when at least two exciters in the sound producing unit vibrate and produce sound at the same time, the sound generated by the vibration of the exciter with the signal filter is used to implement the low frequency compensation for the entire sound producing unit, so as to ensure the good flatness and uniformity of the overall frequency spectrum of the sound produced by the display device using the screen sound producing technology.

Figure 1:
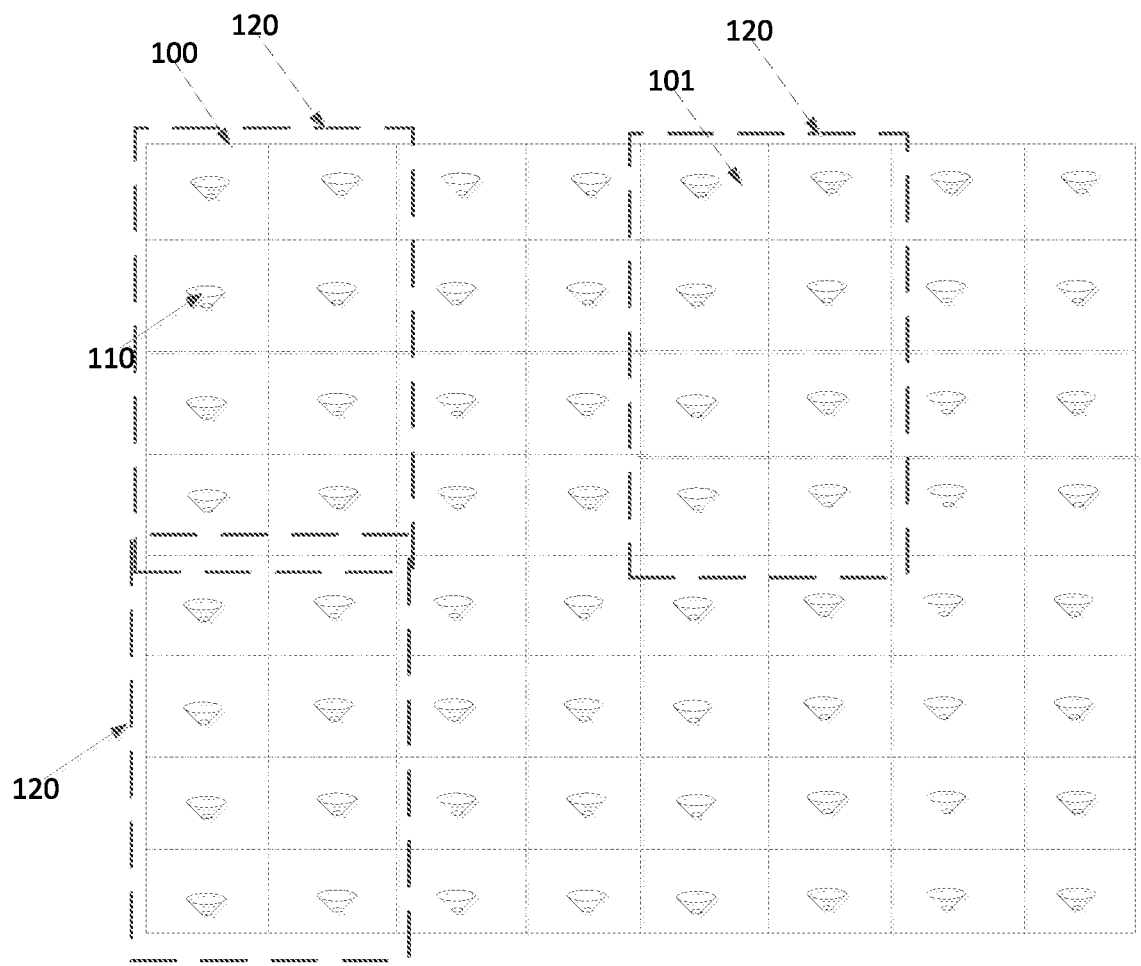
FIG. 1 is a schematic diagram of a plan structure of a display device according to an embodiment of the disclosure.

FIG. 1 is a schematic structural diagram of the display device according to an embodiment of the present disclosure. A plurality of exciters 110 are arranged in an array on the display panel 100. The vibration of at least one exciter 110 can drive the display panel 100 to vibrate. The display panel 100 acts as a vibrating body to generate vibration waves, which are transmitted to human ears to realize screen sound production. In this way, a speaker and an earpiece are not necessary for the display device, and the exciter 110 and the display panel 100 are used as the vibrating body, to realize sound output and the screen sound production of the display panel.

With the above-mentioned display device, when sound is produced on the screen, the audio signal is usually converted into an electrical signal and the electrical signal is outputted to at least one exciter 110 on the display panel 100, so that the exciter 110 generates vibrations with corresponding amplitudes. The amplitude of the vibration of the exciter 110 is different depending on the audio value of the audio signal. In the conventional display panel, each exciter 110 can realize the vibration and sound production of each audio value of the full-frequency signal, and the audio signal to be played is usually transmitted to an exciter 110, and the vibration of the exciter 110 drives the display panel 100 to vibrate and produce sound. However, when an exciter 110 is used to realize full-frequency sound production of the audio signal, the low frequency performance of the full-frequency exciter is poor, and the uniformity and good flatness of the frequency spectrum of the sound cannot be guaranteed.

According to the display device according to the embodiments of the present disclosure, in one embodiment, as shown in FIG. 1, a plurality of exciters 110 provided on the display panel 100 are formed as at least one sound producing unit 120, and each sound producing unit 120 includes at least two exciters 110, wherein each exciter 110 in the same sound producing unit 120 is connected to the same audio signal input end (not shown in the figure), and is used to vibrate and produce sound in response to the same audio signal inputted from the audio signal input end.

The display device according to an embodiment of the present disclosure is as shown in FIG. 1. Optionally, the display panel 100 includes a plurality of sub-panels 101 spliced in sequence, and each sub-panel 101 is respectively provided with one exciter 110, the plurality of exciters 110 provided on the plurality of adjacent sub-panels 101 form a sound producing unit 120, that is, the plurality of exciters 110 provided on the plurality of adjacent sub-panels 101 are all connected to the same audio signal input end, used to vibrate and produce sound in response to the same audio signal inputted from the audio signal input end.

In this embodiment, optionally, the display panel formed by splicing a plurality of sub-panels may be, but not limited to, only a Min LED display panel.

Figure 2:
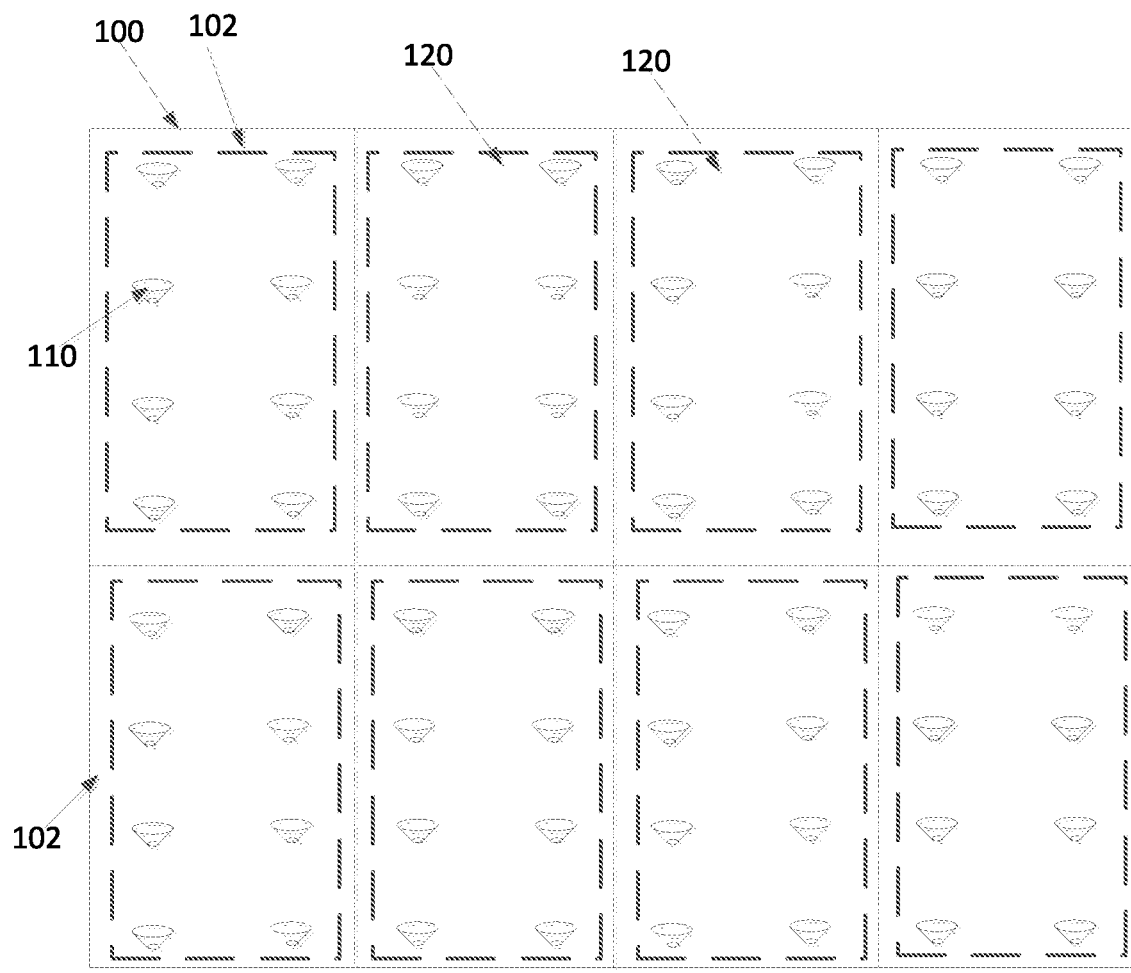
FIG. 2 is another schematic diagram of a plan structure of a display device according to an embodiment of the disclosure.

The display device according to the embodiment of the present disclosure is as shown in FIG. 2. Optionally, the display panel 100 may be an integral panel. The display panel 100 includes a plurality of display areas 102, and each display area 102 is provided with a plurality of exciters 110 arranged in an array, and the plurality of exciters 110 arranged on each display area 102 form a sound producing unit 120, that is, the plurality of exciters 110 arranged on each display area 102 are all connected to the same audio signal input end, and used to vibrate and produce sound in response to the same audio signal inputted from the audio signal input end.

In this embodiment, optionally, the display panel 100 formed as an integral panel can be, but is not limited to, only the Min LED display panel.

With the above implementation, among the plurality of exciters 110 provided on the display panel 100 of the display device, the plurality of exciters 110 are formed as at least one sound producing unit 120, and each sound producing unit 120 includes at least two exciters 110, each exciter 110 in the same sound producing unit 120 is connected to the same audio signal input end. Optionally, the exciters 110 in different sound producing units 120 are connected to different audio signal input ends.

With the display device according to the embodiment of the present disclosure, when an audio signal is inputted to the display device to cause the exciter to vibrate and produce sound, each audio signal that should be currently played is determined according to the display image currently output on the display device. The sound produced by the different sound sources can correspond to different audio signals. For each audio signal, the corresponding sound producing unit that needs to play the audio signal is determined, and the same audio signal is inputted to each exciter in the sound producing unit, so that the plurality of exciters in the same sound producing unit produce sound simultaneously in response to the audio signal.

Optionally, by identifying the sound producing object corresponding to the audio signal in the image information, when the display panel displays the image information, the display position of the sound producing object on the display panel is determined, the sound producing unit at the display position is used to output the audio signal, i.e., by positioning the sound producing object in the image information display by the display device, the sound producing unit at the location of the sound producing object outputs the sound produced by the sound producing object, so as to achieve the effect of integration of sound and image.

In the display device according to the embodiment of the present disclosure, in one of the sound producing units, a signal filter is provided on the audio transmission line from the audio signal input end to the at least one exciter, which is used for low frequency compensation of the sound produced by the entire sound producing unit, to ensure the good flatness and uniformity of the overall frequency spectrum of the sound produced by the display device by using screen sound producing technology.

Figure 3:
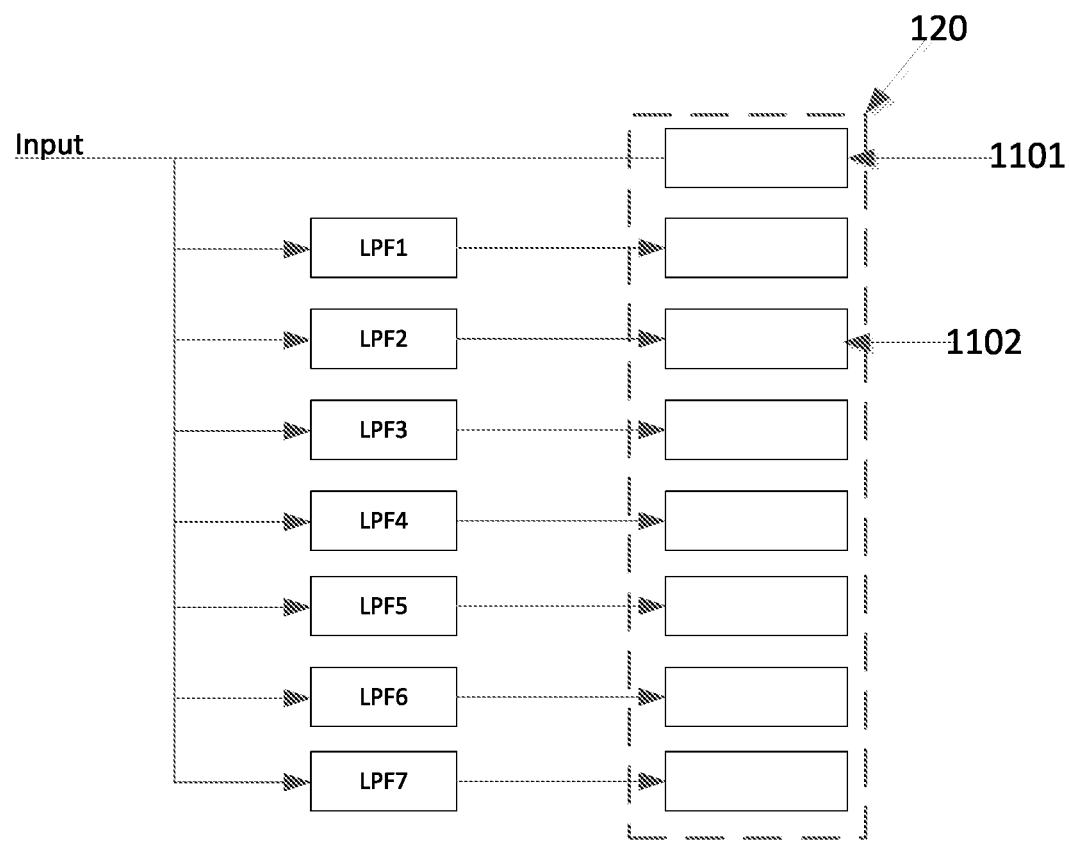
FIG. 3 is a schematic structural diagram of a sound producing unit according to an embodiment of the disclosure.

In one embodiment, as shown in FIG. 3, in the same sound producing unit 120, the audio transmission line from the first exciter 1101 of the at least two exciters 110 to the audio signal input end is not provided with a signal filter, and the audio signal at the audio signal input end is directly transmitted to the first exciter 1101, and the first exciter 1101 vibrates and produces sound;

The audio transmission line from the second exciter 1102 of the at least two exciters 110 other than the first exciter 1101 to the audio signal input end is provided with a low-pass filter (LPF), and the audio signal at the audio signal input end is transmitted through the low-pass filter, the low frequency signal at the audio signal input end is obtained and then transmitted to the second exciter 1102, and the second exciter 1102 vibrates and produces sound.

Optionally, the number of the first exciter 1101 is one, and the second exciter 1102 includes other exciters in one sound producing unit 120 other than the first exciter 1101.

With this embodiment, the low-pass filter LPF connected to the second exciter 1102 extracts the low frequency signal of the outputted audio signal, and the full-frequency sound signal of the outputted audio signal is vibrated and sounded through the first exciter, and the low frequency signal of the outputted audio signal is vibrated and sounded through at least two second exciters at the same time, so as to ensure the uniformity and good flatness of the emitted sound spectrum.

It should be noted that, in the embodiment of the present disclosure, optionally, the number of the first exciter is one, and the audio signal outputted to the first exciter is the sound signal that needs to be outputted, that is, a full-frequency sound signal with any audio value.

Specifically, the principle for increasing the sound pressure level is shown in the following formula:

$$\Delta SPL = \begin{cases} 20 lg(N), f < f0 \\ 10 lg(N), f > f0 \end{cases}$$

Among them, N is the number of exciters, $\Delta SPL$ is the increased amount of sound pressure level relative to a single exciter, f is the audio value, and f0 is a point for dividing low frequency and high frequency.

It can be seen that when the number of exciters is at least two and the audio value f is in the low frequency range, the sound pressure level of a single exciter has an increase of 20 lg (N), and the simultaneous sound production of multiple exciters can significantly increase the low frequency sound pressure level, so as to have uniformity with the sound production of the high frequency signal.

Based on this principle, in the sound control method according to the embodiment of the present disclosure, the low frequency signal of the audio signal is outputted through at least two second exciters 1102, and the frequency spectrum of the sound emitted by each second exciter 1102 overlaps the frequency spectrum of the sound emitted by the first exciter, to realize low frequency compensation and ensure the good flatness and uniformity of the sound spectrum of the sound from the entire device.

It should be noted that, optionally, the point f0 for dividing low frequency and high frequency is between 2 and 5 kHz, that is, the audio value higher than the point f0 can be determined to belong to the high frequency part, and the audio value lower than the point f0 can be determined to belong to the low frequency part. Wherein, the specific value of the point f0, can be determined according to the actual sound producing requirements of the display device.

By adopting the display device of this embodiment, in order to ensure that the sound spectrum of the sound from the entire display device is good and uniform after the spectrum of the sound emitted by each second exciter 1102 is superimposed with the spectrum of the sound emitted by the first exciter 1101, it is necessary to design and coordinate the pass frequency band range of each second exciter 1102, select a suitable low-pass filter, and extract the low frequency signal in the outputted audio signal.

Therefore, in the embodiment of the present disclosure, optionally, it is necessary to test and determine the filtering parameters of the low-pass filter connected to each second exciter 1102.

Optionally, among the low-pass filters provided on the audio transmission line from each second exciter 1102 to the audio signal input end, different low-pass filters have different cut-off frequencies.

For the display device according to the embodiment of the present disclosure, the process of testing and determining the filtering parameters of the low-pass filter connected to each second exciter 1102 may include: reading measured spectrum data; adjusting the filtering parameter of the low-pass filter corresponding to the second exciter according to the measured spectrum data, and obtaining the set filtering parameter corresponding to each low-pass filter.

Among them, when the audio signal inputted by the audio signal input end passes through the low-pass filter, each low-pass filter adopts the corresponding set filtering parameter to extract the low frequency signal of the audio signal, and the extracted low frequency signal is transmitted to the corresponding second exciter, so that the second exciter vibrates and produces sound.

Optionally, adjusting the filtering parameter of the low-pass filter corresponding to the second exciter according to the measured spectrum data, and obtaining the set filtering parameter corresponding to each low-pass filter includes:

in the case that the filtering parameters of the low-pass filter corresponding to each of the second exciters are respectively initial filtering parameters, obtaining a first spectrum curve when the first exciter outputs the full audio signal of the measured spectrum data, a second spectrum curve when each of the exciters of the sound producing unit respectively outputs the full audio signal of the measured spectrum data, and a third spectrum curve when the first exciter outputs the full audio signal of the measured spectrum data, and N second exciters outputs the low frequency signal of the measured spectrum data; where N is the number of second exciters;

adjusting the filtering parameters to obtain the set filtering parameter of the low-pass filter corresponding to each of the second exciters according to comparison results of the first spectrum curve, the second spectrum curve, and the third spectrum curve.

Figure 4:
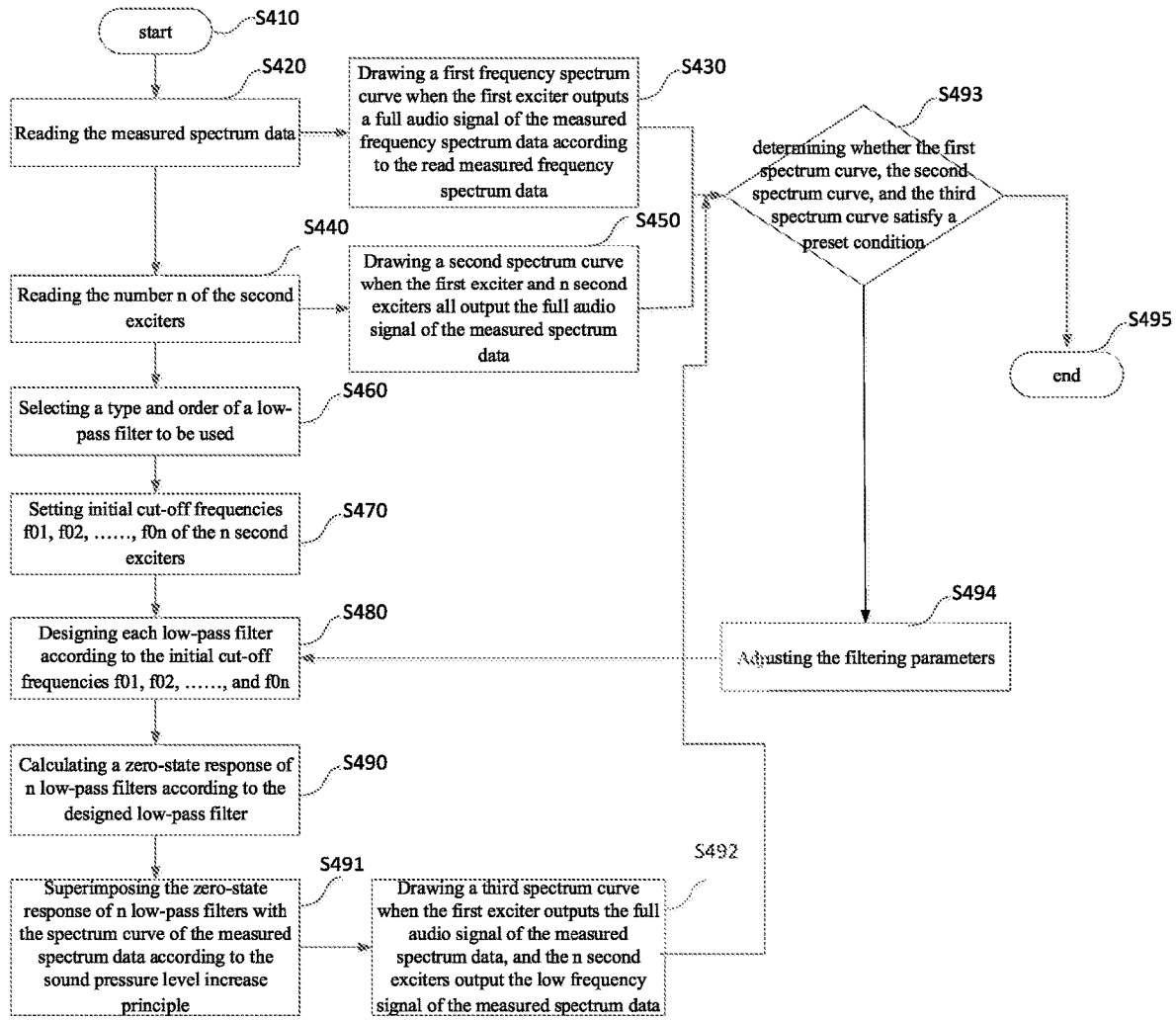
FIG. 4 is a schematic diagram of a process of testing and determining the filtering parameters of the low-pass filter according to an embodiment of the disclosure.

Specifically, in conjunction with FIG. 4, the process of testing and determining the filtering parameters of the low-pass filter connected to each second exciter 1102 can start from step S410, and further include:

S420: Reading the measured spectrum data;

S430: Drawing a first frequency spectrum curve when the first exciter outputs a full audio signal of the measured frequency spectrum data according to the read measured frequency spectrum data;

S440: Reading the number n of the second exciters (that is, for low frequency compensation);

S450: Drawing a second spectrum curve when the first exciter and n second exciters all output the full audio signal of the measured spectrum data;

S460: Selecting a type and order of a low-pass filter to be used;

S470: Setting initial cut-off frequencies f01, f02, . . . , f0n of the n second exciters; optionally, the initial cut-off frequencies of then second exciters may be the same or different from each other;

S480: Designing each low-pass filter according to the initial cut-off frequencies f01, f02, . . . , and f0n;

S490: Calculating a zero-state response of n low-pass filters according to the designed low-pass filter;

S491: Superimposing the zero-state response of n low-pass filters with the spectrum curve of the measured spectrum data according to the sound pressure level increase principle;

S492: Drawing a third spectrum curve when the first exciter outputs the full audio signal of the measured spectrum data, and the n second exciters output the low frequency signal of the measured spectrum data;

S493: Comparing the first spectrum curve, the second spectrum curve, and the third spectrum curve, and determining whether the first spectrum curve, the second spectrum curve, and the third spectrum curve satisfy a preset condition, when the preset condition is met, the process ends, and S495 is executed to obtain the set filtering parameters of the low-pass filter corresponding to each second exciter. In the embodiment of the present disclosure, the cut-off frequency of the low-pass filter corresponding to each second exciter is obtained; when the preset condition is not met, step S494 is executed;

S494: Adjusting the filtering parameters, such as adjusting the cut-off frequency of the low-pass filter corresponding to each second exciter, to re-obtaining the first spectrum curve, the second spectrum curve, and the third spectrum curve, and returning to step S480;

S495: the end.

In the embodiment of the present disclosure, optionally, the initial filtering parameters include filter type, order, and cut-off frequency;

Wherein, the adjusting the filtering parameters includes: adjusting the cut-off frequency of each of the low-pass filters.

Further, optionally, the preset condition satisfied among the first spectrum curve, the second spectrum curve, and the third spectrum curve is:

a distance between the low frequency part of the third spectrum curve and the first spectrum curve is less than a first preset value, and the distance between the high frequency part of the third spectrum curve and the second spectrum curve is less than a second preset value, and a transition segment between the low frequency part and the high frequency part is a smooth segment.

According to the display device in the embodiment of the present disclosure, the filtering parameter of the low-pass filter connected to each second exciter is tested and determined by the above method, so as to ensure that after the determined filtering parameter is used to extract the low frequency signal of the audio signal, the frequency spectrum of the sound produced by the vibration of the second exciter 1102 is superimposed with the frequency spectrum of the sound produced by the vibration of the first exciter 1101, which has good flatness and uniformity.

Figure 5:
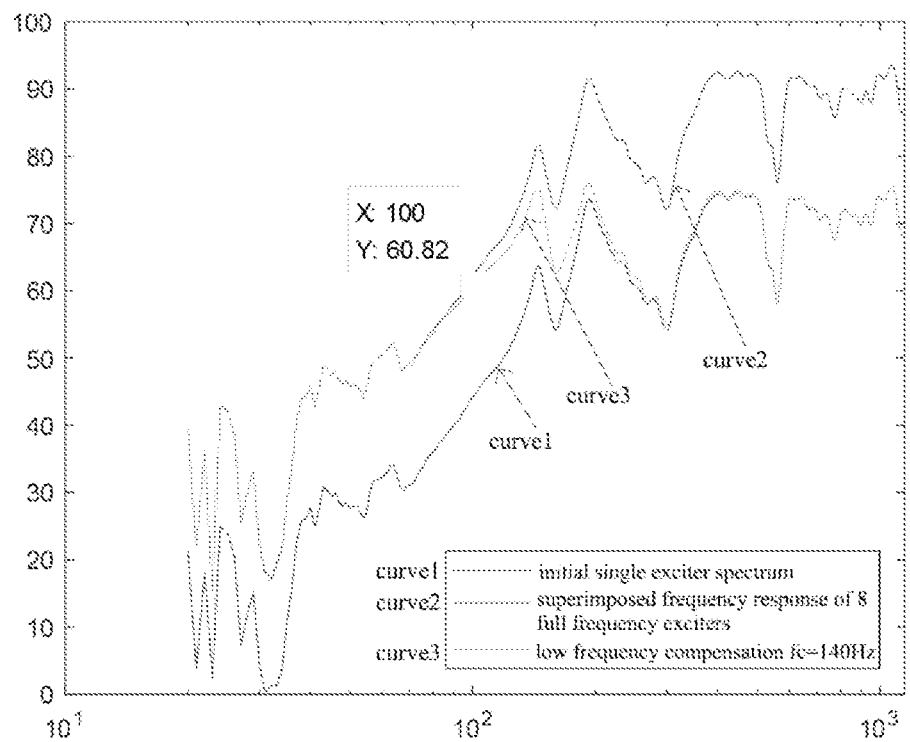
FIG. 5 is a schematic diagram of a frequency spectrum curve generated by the display device according to the embodiment of the present disclosure.

In the display device according to the embodiment of the present disclosure, optionally by considering the increase in low frequency sound pressure level, the smoothness of the transition near the junction, and the complexity of the low-pass filter design, 7 low-pass exciters are used, that is, each sound producing unit includes 7 second exciters and 1 first exciter. Optionally, the low frequency signal of each second exciter is generated by a 4-order Butterworth LPF with a cut-off frequency of 140 Hz. Taking this set parameter as an example, as shown in the vocal simulation spectrum curve shown in FIG. 5, in the display device according to the embodiment of the present disclosure, the sound producing spectrum compensated by low frequency can ensure the uniformity of the spectrum of the full-frequency signal transmitted by a single exciter.

Tests have proved that the use of the display device described in the embodiment of the present disclosure can achieve a better low frequency compensation effect, and the sound pressure level at frequencies above 100 Hz can reach above 60.82 dB.

Figure 6:
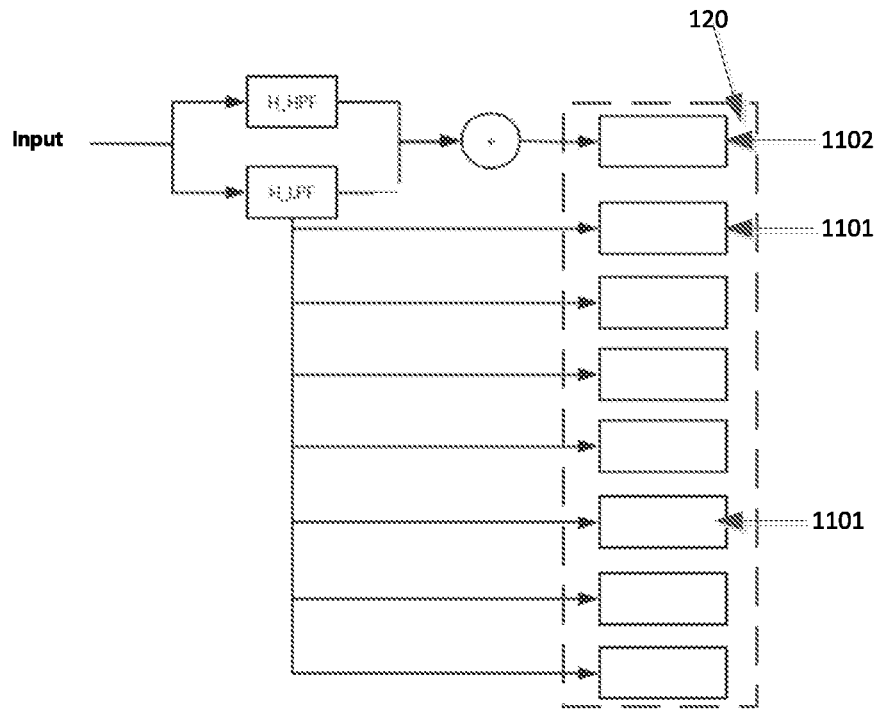
FIG. 6 is another schematic structural diagram of the sound producing unit according to an embodiment of the disclosure.

In another display device according to the embodiment of the present disclosure, as shown in FIG. 6, in the same sound producing unit 120, the audio transmission line from the first exciter 1101 of the at least two exciters to the audio signal input end is provided with a low-pass filter LPF, the audio signal at the audio signal input end passes through the low-pass filter to obtain the low frequency signal of the audio signal and then transmit the same to the first exciter 1101, and the first exciter 1101 vibrates and produces sound.

The first audio transmission line from the second exciter 1102 of the at least two exciters 110 other than the first exciter 1101 to the audio signal input end is provided with a low-pass filter LPF, and the second audio transmission line from the second exciter 1102 to the audio signal input end is provided with a high-pass filter HPF, and the audio signal at the audio signal input end passes through a low-pass filter LPF to obtain a low frequency signal, passes through the high-pass filter HPF to obtain a high frequency signal, and the low frequency signal and the high frequency signal are superimposed and transmitted to the second exciter 1102, and the second exciter 1102 vibrates and produces sound.

In this embodiment, optionally, the number of the second exciter 1102 is one, and in one sound producing unit, all exciters other than the second exciter 1102 are the first exciters 1101. Optionally, the number of the first exciters 1101 can be seven.

Further, optionally, a plurality of first exciters 1101 share the same low-pass filter LPF, that is, after the audio signal at the audio signal input end passes through the low-pass filter, the obtained low frequency signals are respectively transmitted to each first exciter 1101.

In addition, optionally, as shown in FIG. 6, the low-pass filter LPF provided on the audio transmission line from the second exciter 1102 to the audio signal input end, and the low-pass filter LPF provided on the audio transmission line from the first exciter 1101 to the audio signal input end is the same low-pass filter LPF.

In this embodiment, the low-pass filter LPF is used to extract the low frequency signal of the audio signal. The low frequency signal is generated by using at least two first exciters 1101 to vibrate and produce sound simultaneously. After the low frequency signal and the high frequency signal of the outputted audio signal are extracted, the low frequency signal is superimposed with the high frequency signal to make the second exciter 1102 to vibrate and produce sound. In this way, the frequency spectrum of the sound produced by the vibration of a plurality of first exciters and the frequency spectrum of the sound produced by the vibration of the second exciter 1102 are superimposed to realize low frequency compensation and ensure the good flatness and uniformity of the frequency spectrum of the sound from the entire device.

In addition, compared with the embodiment shown in FIG. 3, with this embodiment, for audio signals in any frequency, it can be ensured that the first exciter 1101 and the second exciter 1102 have the same phase of vibration and sound production.

Figure 7:
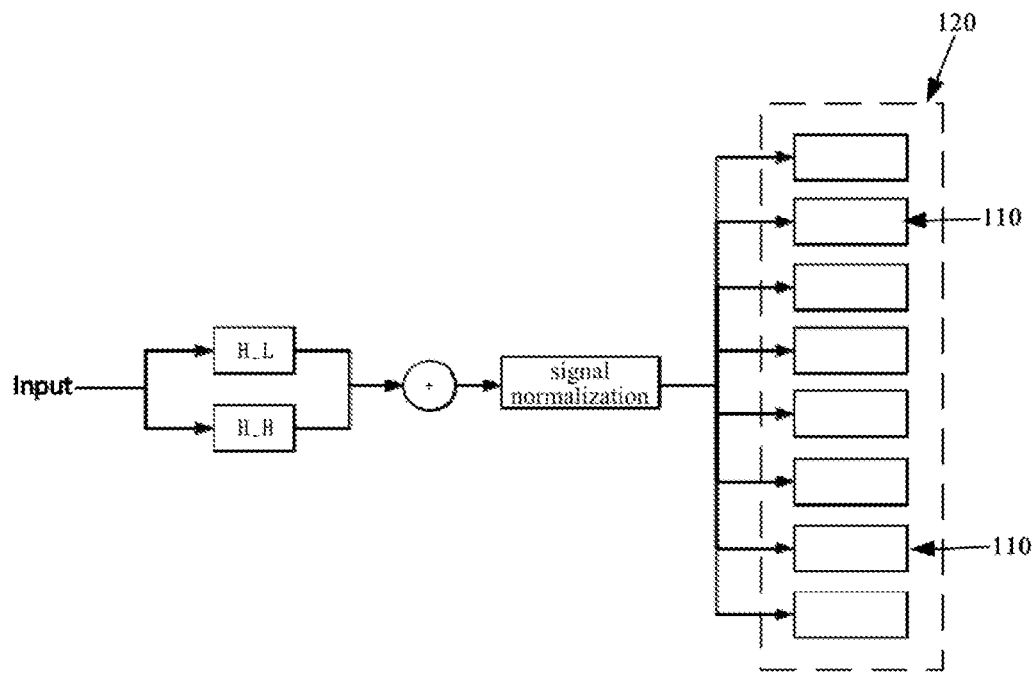
FIG. 7 is yet another schematic structural diagram of the sound producing unit according to an embodiment of the disclosure.

In yet another implementation of the display device according to the embodiment of the present disclosure, as shown in FIG. 7, in the same sound producing unit, the audio transmission line from the audio signal input end to each exciter 110 is provided with a low-pass filter LPF and a high-pass filter HPF. The audio signal at the audio signal input end passes through the low-pass filter LPF to obtain a low frequency signal, passes through the high-pass filter HPF to obtain a high frequency signal, and the low frequency signal and the high frequency signal are superimposed and normalized, the signal is transmitted to each of the exciters 110, and each of the exciters 110 vibrates and produces sound respectively.

Figure 8:
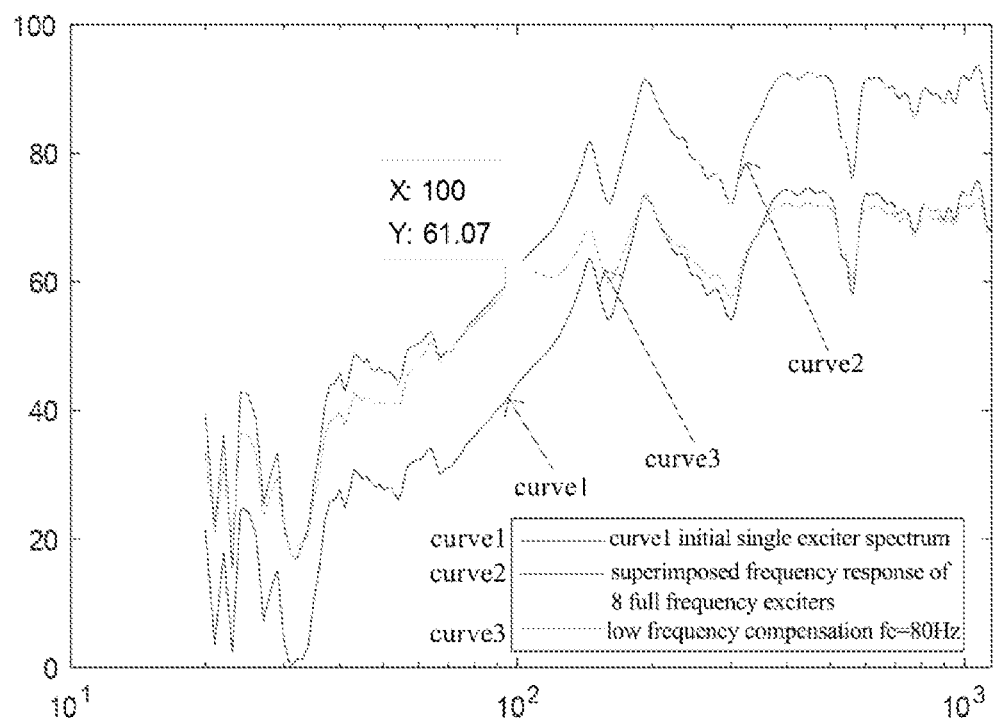
FIG. 8 is another schematic diagram of a frequency spectrum curve generated by the display device according to an embodiment of the present disclosure.

With this embodiment, the audio signal inputted at the audio signal input end is filtered by the low-pass filter LPF and the high-pass filter HPF, respectively, and the extracted low frequency signal and high frequency signal are superimposed and normalized. The normalized signal is transmitted to each exciter 110, the sound spectrum having the low frequency compensation effect can be obtained. Taking the cut-off frequency fc=80 Hz of the low-pass filter LPF as an example, as shown in FIG. 8, a sound spectrum with good uniformity and flatness can be obtained.

Experimental tests have proved that, compared with the display device of the embodiment shown in FIG. 3, the display device according to this embodiment has a better low frequency compensation effect, and the sound pressure level at frequencies above 100 Hz can reach above 61 dB.

With the display device according to the embodiment of the present disclosure, a signal filter is provided on the audio transmission line of at least one exciter. When at least two exciters in the sound producing unit vibrate and produce sound at the same time, the sound produced by the vibration of the exciter provided with the signal filter is used to implement low frequency compensation for the sound produced by the entire sound producing unit to ensure the good flatness and uniformity of the overall frequency spectrum of the sound produced by the display device using the screen sound production technology.

Figure 9:
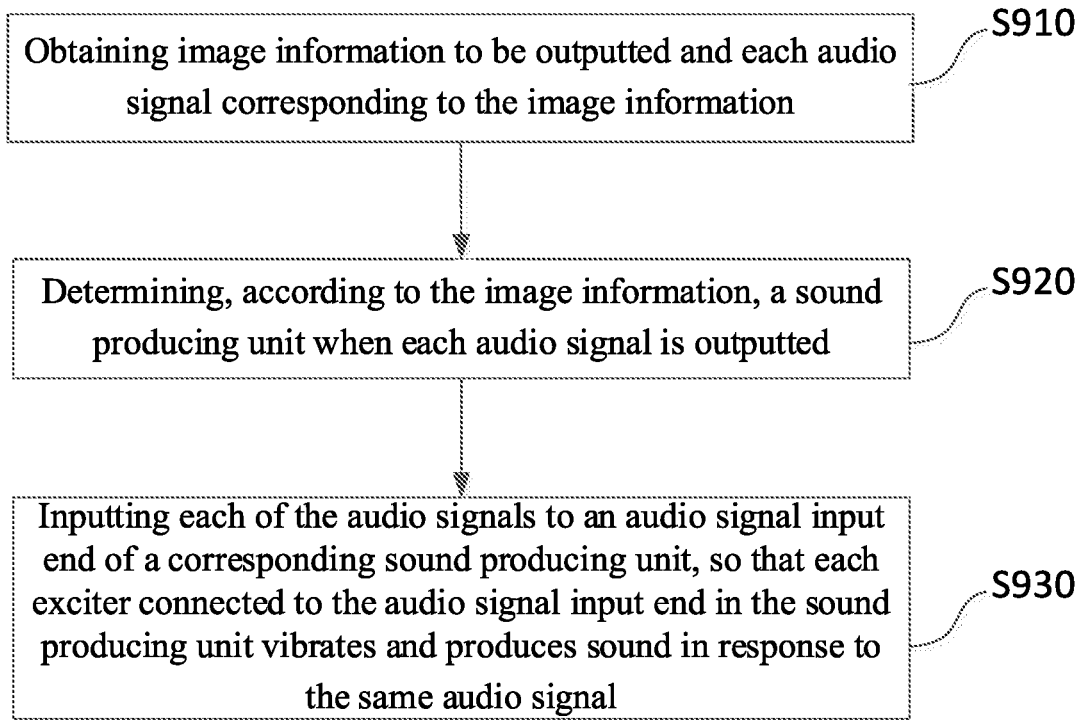
FIG. 9 is a schematic flowchart of a sound producing control method according to an embodiment of the disclosure.

Another embodiment of the present disclosure further provides a sound producing control method, which is applied to the display device described in any one of the above. As shown in FIG. 9, the method includes:

S910: Obtaining image information to be outputted and each audio signal corresponding to the image information.

S920: Determining, according to the image information, a sound producing unit when each audio signal is outputted;

S930: Inputting each of the audio signals to an audio signal input end of a corresponding sound producing unit, so that each exciter connected to the audio signal input end in the sound producing unit vibrates and produces sound in response to the same audio signal.

By using the sound producing control method described in this embodiment, the same audio signal can be transmitted to at least two exciters in a sound producing unit for vibrating and producing sound. The sound produced by the vibration of the exciter with a signal filter is used to implement the low frequency compensation for the sound produced by the entire sound producing unit, to ensure the good flatness and uniformity of the overall frequency spectrum of the sound produced by the display device using the screen sound producing technology.

Optionally, in the sound producing control method, wherein, in step S920, determining the sound producing unit when each audio signal is outputted according to the image information includes:

Identifying a sound producing object corresponding to the audio signal in the image information;

Determining a display position of the sound producing object in the image information on the display panel when the display panel is displaying the image information;

Determining the sound producing unit arranged at the display position to be used to output the audio signal.

By adopting the above method of determining the sound producing unit when the audio signal is outputted, the position of the sound producing object in the image displayed on the display panel can be kept consistent with the position of the output of the audio signal, and the effect of sound and picture integration can be achieved.

Figure 10:
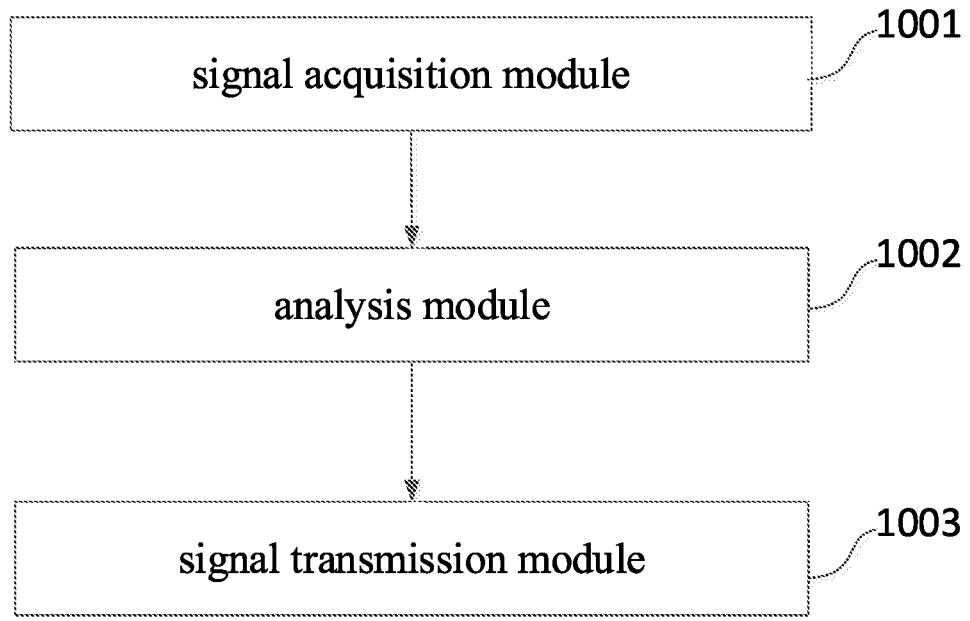
FIG. 10 is a schematic structural diagram of a sound producing control device according to an embodiment of the disclosure.

Another embodiment of the present disclosure also provides a sound producing control device, which is applied to the display device described in any one of the above. As shown in FIG. 10, the device includes:

a signal acquisition module 1001, configured to acquire image information to be outputted and each audio signal corresponding to the image information;

an analysis module 1002, configured to determine a sound producing unit when each audio signal is outputted according to the image information;

a signal transmission module 1003, configured to input each of audio signals to the audio signal input end of a corresponding sound producing unit, so that each exciter connected to the audio signal input end in the sound producing unit vibrates and produces sound in responding to the same audio signal.

Optionally, in the sound producing control device, the analysis module 1002 determines the sound producing unit when each audio signal is outputted according to the image information, which is specifically used for:

Identifying a sound producing object corresponding to the audio signal in the image information;

Determining a display position of the sound producing object in the image information on the display panel when the display panel is displaying the image information;

Determining the sound producing unit arranged at the display position to be used for sound output of the audio signal.

Figure 11:
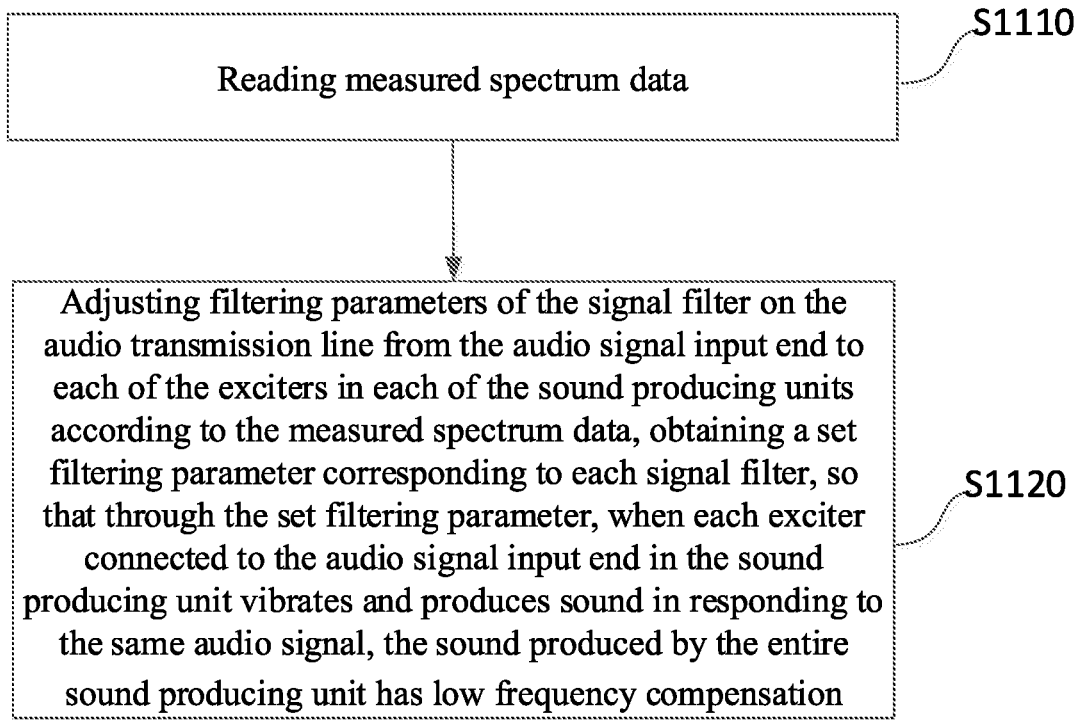
FIG. 11 is a schematic flowchart of a signal filtering parameter determining method according to an embodiment of the disclosure.

On the other hand, the embodiments of the present disclosure also provide a method for determining signal filtering parameters, which is applied to the display device as described in any one of the above. As shown in FIG. 11, the method includes:

S1110: Reading measured spectrum data;

S1120: Adjusting filtering parameters of the signal filter on the audio transmission line from the audio signal input end to each of the exciters in each of the sound producing units according to the measured spectrum data, obtaining a set filtering parameter corresponding to each signal filter, so that through the set filtering parameter, when each exciter connected to the audio signal input end in the sound producing unit vibrates and produces sound in responding to the same audio signal, the sound produced by the entire sound producing unit has low frequency compensation.

Using the method for determining the signal filtering parameters of the embodiment of the present disclosure, the filtering parameters of the signal filter set in the display device of the embodiment of the present disclosure can be determined, so as to ensure that the signal filter with the filtering parameters has low frequency compensation effect when the exciter vibrates and produces sound.

Optionally, in the method for determining signal filtering parameters, in the same sound producing unit, no signal filter is provided on the audio transmission line from the first exciter to the audio signal input end, and a low-pass filter is provided on the audio transmission line from each second exciter of at least two exciters other than the first exciter, in step S1120, adjusting filtering parameters of the signal filter on the audio transmission line from the audio signal input end to each of the exciters in each of the sound producing units according to the measured spectrum data, obtaining a set filtering parameter corresponding to each signal filter, so that through the set filtering parameter includes:

in the case that the filtering parameters of the low-pass filter corresponding to each of the second exciters are respectively initial filtering parameters, obtaining a first spectrum curve when the first exciter outputs the full audio signal of the measured spectrum data, a second spectrum curve when each of the exciters of the sound producing unit respectively outputs the full audio signal of the measured spectrum data, and a third spectrum curve when the first exciter outputs the full audio signal of the measured spectrum data, and N second exciters outputs the low frequency signal of the measured spectrum data; where N is the number of second exciters;

adjusting the filtering parameters to obtain the set filtering parameter of the low-pass filter corresponding to each of the second exciters according to comparison results of the first spectrum curve, the second spectrum curve, and the third spectrum curve.

Optionally, in the method for determining signal filtering parameters, obtaining the third spectrum curve when the first exciter outputs the full audio signal of the measured spectrum data, and N second exciters outputs the low frequency signal of the measured spectrum data includes:

Calculating the zero-state responses of the N second exciters according to the initial filtering parameters corresponding to the low-pass filters of each of the second exciters;

Superimposing the zero-state response of the N second exciters and the spectrum curve of the measured spectrum data to generate the third spectrum curve.

Optionally, in the method for determining signal filtering parameters, the initial filtering parameters include filter type, order, and cut-off frequency;

Wherein, the adjusting the filtering parameters includes:

Adjusting the cut-off frequency of each of the low-pass filters.

Optionally, in the method for determining signal filtering parameters, adjusting the filtering parameters according to the comparison result of the first spectrum curve, the second spectrum curve and the third spectrum curve to obtain the set filtering parameters of the low-pass filter corresponding to the second exciter includes:

Comparing the first spectrum curve, the second spectrum curve and the third spectrum curve;

When the first spectrum curve, the second spectrum curve, and the third spectrum curve do not meet a preset condition, adjusting the filtering parameters to re-obtain the first spectrum curve, the second spectrum curve, and the third spectrum curve;

When the first frequency spectrum curve, the second frequency spectrum curve, and the third frequency spectrum curve meet the preset condition, obtaining set filtering parameters of a low-pass filter corresponding to each of the second exciters.

Optionally, in the method for determining signal filtering parameters, the preset condition is:

A distance between the low frequency part of the third spectrum curve and the first spectrum curve is less than a first preset value, and a distance between the high frequency part of the third spectrum curve and the second spectrum curve is less than a second preset value, and the transition segment between the low frequency part and the high frequency part is a smooth segment.

Figure 12:
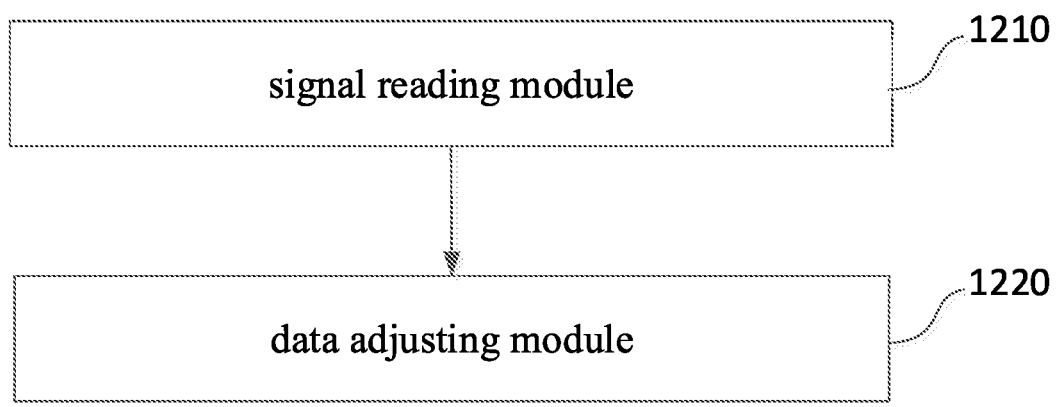
FIG. 12 is a schematic structural diagram of a signal filtering parameter determining device according to an embodiment of the disclosure.

Another embodiment of the present disclosure further provides a device for determining signal filtering parameters, which is applied to the display device described in any one of the above. As shown in FIG. 12, the device includes:

A signal reading module 1210, configured to read measured spectrum data;

A data adjusting module 1220, configured to adjust filtering parameters of the signal filter on the audio transmission line from the audio signal input end to each of the exciters in each of the sound producing units according to the measured spectrum data, obtain a set filtering parameter corresponding to each signal filter, so that through the set filtering parameter, when each exciter connected to the audio signal input end in the sound producing unit vibrates and produces sound in responding to the same audio signal, the sound produced by the entire sound producing unit has low frequency compensation.

Optionally, in the device for determining signal filtering parameters, in the same sound producing unit, no signal filter is provided on the audio transmission line from the first exciter to the audio signal input end, and a low-pass filter is provided on the audio transmission line from each second exciter of at least two exciters other than the first exciter, the data adjusting modules 1220 adjusts filtering parameters of the signal filter on the audio transmission line from the audio signal input end to each of the exciters in each of the sound producing units according to the measured spectrum data, obtain a set filtering parameter corresponding to each signal filter, so that through the set filtering parameter includes:

in the case that the filtering parameters of the low-pass filter corresponding to each of the second exciters are respectively initial filtering parameters, obtaining a first spectrum curve when the first exciter outputs the full audio signal of the measured spectrum data, a second spectrum curve when each of the exciters of the sound producing unit respectively outputs the full audio signal of the measured spectrum data, and a third spectrum curve when the first exciter outputs the full audio signal of the measured spectrum data, and N second exciters outputs the low frequency signal of the measured spectrum data; where N is the number of second exciters;

adjusting the filtering parameters to obtain the set filtering parameter of the low-pass filter corresponding to each of the second exciters according to comparison results of the first spectrum curve, the second spectrum curve, and the third spectrum curve.

Optionally, in the device for determining signal filtering parameters, obtaining, by the data adjusting module 1220, the third spectrum curve when the first exciter outputs the full audio signal of the measured spectrum data, and N second exciters outputs the low frequency signal of the measured spectrum data includes:

Calculating the zero-state responses of the N second exciters according to the initial filtering parameters corresponding to the low-pass filters of each of the second exciters;

Superimposing the zero-state response of the N second exciters and the spectrum curve of the measured spectrum data to generate the third spectrum curve.

Optionally, in the device for determining signal filtering parameters, the initial filtering parameters include filter type, order, and cut-off frequency;

Wherein, the adjusting the filtering parameters includes:
Adjusting the cut-off frequency of each of the low-pass filters.

Optionally, in device for determining signal filtering parameters, adjusting, by the data adjusting module 1220, the filtering parameters according to the comparison result of the first spectrum curve, the second spectrum curve and the third spectrum curve to obtain the set filtering parameters of the low-pass filter corresponding to the second exciter includes:

Comparing the first spectrum curve, the second spectrum curve and the third spectrum curve;

When the first spectrum curve, the second spectrum curve, and the third spectrum curve do not meet a preset condition, adjusting the filtering parameters to re-obtain the first spectrum curve, the second spectrum curve, and the third spectrum curve;

When the first frequency spectrum curve, the second frequency spectrum curve, and the third frequency spectrum curve meet the preset condition, obtaining set filtering parameters of a low-pass filter corresponding to each of the second exciters.

Optionally, in the device for determining signal filtering parameters, the preset condition is:

A distance between the low frequency part of the third spectrum curve and the first spectrum curve is less than a first preset value, and a distance between the high frequency part of the third spectrum curve and the second spectrum curve is less than a second preset value, and the transition segment between the low frequency part and the high frequency part is a smooth segment.

Figure 13:
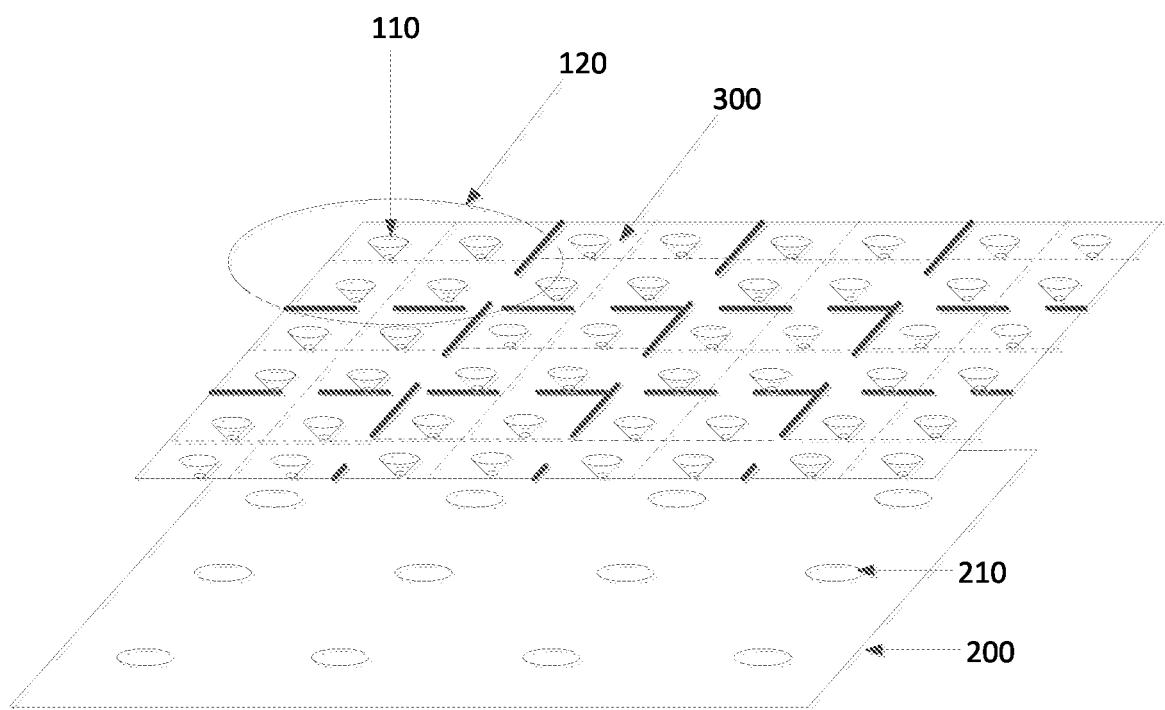
FIG. 13 is a schematic diagram of a three-dimensional structure of the screen sound producing device according to an embodiment of the disclosure.

On the other hand, the embodiments of the present disclosure also provide a screen sound producing device, as shown in FIG. 13, including:

A plurality of sound producing units 120 arranged in an array, each sound producing unit including at least two exciters 110;

A circuit board 200, provided with a plurality of audio input ends 210, wherein each audio input end 210 corresponds to one sound producing unit 120, and the audio input end 210 is connected to each exciter 110 of the corresponding sound producing unit through an audio transmission line; wherein, in each sound producing unit 120, a signal filter is provided on the audio transmission line from the audio input end 210 to at least one exciter.

Using the screen sound producing device of this embodiment, one audio input end 210 is connected to each exciter 110 of one sound producing unit 120, so that the plurality of exciters 110 of the sound producing unit 120 vibrate and produce sound at the same time, and the exciter with a signal filter is used to vibrate and produce sound, low frequency compensation is implemented for the sound produced by the entire sound producing unit 120.

In the screen sound producing device according to the embodiment of the present disclosure, as shown in FIG. 13, each sound producing unit 120 further includes a plurality of display units 300 arranged in an array, and each display unit 300 is respectively provided with an exciter 110.

Optionally, the display units 300 of the plurality of sound producing units 120 are formed as one display panel, or one display unit 300 is formed as one display sub-panel, and adjacent display sub-panels are spliced together.

Wherein, when the display units 300 of the plurality of sound producing units 120 are formed as one display panel, that is, the plurality of display units 300 are combined to form an integral panel, and each display unit 300 corresponds to one display area, and one exciter 110 is provided respectively. At least two display areas 300 arranged in an array and the exciter 110 arranged on each display area 300 form a sound producing unit 120. In one sound producing unit 120, the exciters 110 respectively provided on each display area 300 are respectively connected to the same audio signal input end.

Optionally, when the display unit 300 of the plurality of sound producing units 120 is formed as one display panel, the display panel may be, but not limited to, only an OLED display panel.

In another embodiment, one display unit 300 is formed as one display sub-panel, and adjacent display sub-panels are spliced together to form a full-screen display panel. Wherein, each display sub-panel is respectively provided with one exciter 110, the plurality of adjacent display sub-panels and the exciter 110 provided on each display sub-panel form a sound producing unit 120, and each exciter 110 of one sound producing units 120 is connected to the same audio signal input end.

In this embodiment, optionally, the display panel formed by splicing a plurality of display sub-panels may be, but not limited to, a Min LED display panel.

The screen sound producing device according to the embodiment of the present disclosure is as shown in FIG. 3, the audio transmission line from the first exciter 1101 of the at least two exciters 110 to the audio signal input end is not provided with a signal filter;

The audio transmission line from the second exciter 1102 of the at least two exciters 110 other than the first exciter 1101 to the audio signal input end is provided with a low-pass filter (LPF).

With this implementation, the audio signal at the audio signal input end is directly transmitted to the first exciter 1101, and the first exciter 1101 vibrates and produces sound; the audio signal at the audio signal input end passes through the low-pass filter to obtain the low frequency signal of the audio signal input end, and transmits the same to the second exciter 1102, and the second exciter 1102 vibrates and produces sound.

Optionally, the number of the first exciter 1101 is one, and the audio signal outputted to the first exciter is also the sound signal to be outputted, that is, the full-frequency sound signal including any audio value. The second exciter 1102 includes every exciter in one sound producing unit 120 other than the first exciter 1101.

With this embodiment, the low-pass filter LPF connected to the second exciter 1102 extracts the low frequency signal of the outputted audio signal, and the first exciter vibrates and produces sound for the full-frequency sound signal of the outputted audio signal, and at least two second exciters vibrate and produce sound at the same time for the low frequency signal of the audio signal, so as to ensure the uniformity and good flatness of the sound spectrum. Another implementation of the screen sound producing device according to the embodiment of the present disclosure is as shown in FIG. 6, a low-pass filter LPF is provided on the audio transmission line from the first exciter 1101 of at least two exciters to the audio signal input end;

A low-pass filter LPF is provided on the first audio transmission line from the second exciter 1102 of the at least two exciters 110 other than the first exciter 1101 to the audio signal input end; a high-pass filter HPF is provided on the second audio transmission line from the second exciter to the audio signal input end.

With this implementation, the audio signal at the audio signal input end passes through the low-pass filter to obtain the low frequency signal of the audio signal, and the low frequency signal is transmitted to the first exciter 1101, the first exciter 1101 vibrates and produces sound; the audio signal at the audio signal input end passes through a low-pass filter LPF to obtain a low frequency signal, passes through the high-pass filter HPF to obtain a high frequency signal, and the low frequency signal and the high frequency signal are superimposed and transmitted to the second exciter 1102, the second exciter 1102 vibrates and produces sound.

Optionally, the number of the second exciter 1102 is one. In one sound producing unit, all exciters other than the second exciter 1102 are the first exciter 1101. Optionally, the number of the first exciters 1101 can be seven.

Further, optionally, a plurality of first exciters 1101 share the same low-pass filter LPF, that is, after the audio signal at the audio signal input end passes through the low-pass filter, the obtained low frequency signals are respectively transmitted to each first exciter 1101.

In addition, optionally, as shown in FIG. 6, the low-pass filter LPF on the audio transmission line from the second exciter 1102 to the audio signal input end, and the low-pass filter LPF on the audio transmission line from the first exciter 1101 to the audio signal input end is the same low-pass filter LPF.

In this embodiment, the low-pass filter LPF is used to extract the low frequency signal of the audio signal. The low frequency signal is generated by using at least two first exciters 1101 to vibrate and produce sound simultaneously. After the low frequency signal and the high frequency signal of the outputted audio signal are extracted, the low frequency signal is superimposed with the high frequency signal to make the second exciter 1102 to vibrate and produce sound. In this way, the frequency spectrum of the sound produced by the vibration of a plurality of first exciters and the frequency spectrum of the sound produced by the vibration of the second exciter 1102 are superimposed to realize low frequency compensation and ensure the good flatness and uniformity of the frequency spectrum of the sound from the entire device. In the screen sound producing device according to the embodiment of the present disclosure, as shown in FIG. 7, in the same sound producing unit 120, the audio transmission line from the audio signal input end to each exciter 110 is provided with and a low-pass filter LPF and a high-pass filter HPF.

With this implementation structure, the audio signal at the audio signal input end passes through the low-pass filter LPF to obtain a low frequency signal, passes through the high-pass filter HPF to obtain a high frequency signal, and the low frequency signal and the high frequency signal are superimposed and normalized, and then transmitted to each of the exciters 110, and each of the exciters 110 vibrates and produces sound respectively.

With this embodiment, the audio signal inputted at the audio signal input end is filtered by a low-pass filter LPF and a high-pass filter HPF, respectively, and the extracted low frequency signal and high frequency signal are superimposed and normalized. The normalized signal is transmitted to each exciter 110, the sound spectrum of the low frequency compensation effect can be obtained. Taking the cut-off frequency fc=80 Hz of the low-pass filter LPF as an example, as shown in FIG. 8, a sound spectrum with good uniformity and flatness can be obtained.

The screen sound producing device according to the embodiment of the present disclosure optionally further includes a processor for inputting an audio signal to each audio input end.

Optionally, the processor is specifically configured to acquire a display image to be outputted and each audio signal corresponding to the display image, determine a sound producing unit when each audio signal is outputted according to the display image, and input each audio signal to the audio signal input end of the corresponding sound producing unit, so that each exciter connected to the audio signal input end in the sound producing unit vibrates and produces sound in response to the same audio signal.

In the embodiments of the present disclosure, optionally, the exciter may be a piezoelectric ceramic exciter or a micro-vibration exciter.

In addition, it should be noted that the sound producing control method of the screen sound producing device according to the embodiment of the present disclosure can be used for the sound producing method of the display device. In addition, the method for determining signal filtering parameters used in the sound producing device of the embodiment of the present disclosure can be applied to the method for determining signal filtering parameters adopted by the above-mentioned display device, which will not be described in detail here.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display device comprising a display panel, wherein the display device further includes:
a plurality of exciters arranged on the display panel, the display panel producing sound on a screen through the plurality of exciters;
wherein, the plurality of the exciters are formed as at least one sound producing unit, each sound producing unit includes at least two exciters, and each exciter in the same sound producing unit is connected to a same audio signal input end, in one sound producing unit, a signal filter is provided on an audio transmission line from the audio signal input end to each exciter, and used for low frequency compensation of a sound produced by the entire sound producing unit,
wherein, the signal filter comprises a low-pass filter and a high-pass filter, in the same sound producing unit, the low-pass filter and the high-pass filter are provided on the audio transmission line from the audio signal input end to each exciter of the at least two exciters, and an audio signal at the audio signal input end passes through the low-pass filter to obtain a low frequency signal, passes through the high-pass filter to obtain a high frequency signal, and the low frequency signal and the high frequency signal are superimposed, normalized and then transmitted to each exciter of the at least two exciters, the each exciter of the at least two exciters vibrates and produces sound.

2. The display device according to claim 1, wherein the plurality of the exciters is formed as at least two sound producing units, and exciters in different sound producing units are connected to different audio signal input ends.

3. The display device according to claim 1, wherein the display panel comprises a plurality of sub-panels spliced in sequence, each sub-panel is provided with one exciter, wherein exciters arranged on a plurality of adjacent sub-panels are formed as one sound producing unit.

4. The display device according to claim 1, wherein the display panel comprises a plurality of display areas, each display area is provided with a plurality of exciters in an array, and the plurality of exciters arranged on each display area are formed as one sound producing unit.

5. A sound producing control method, applied to the display device according to claim 1, the method comprises:
obtaining image information to be outputted and at least one audio signal corresponding to the image information;
determining a corresponding sound producing unit when each audio signal of the at least one audio signals is outputted according to the image information;
inputting each audio signal of the at least one audio signal to the audio signal input end of the corresponding sound producing unit, so that each exciter of the at least two exciters connected to the audio signal input end in the sound producing unit vibrates and produces sound in response to the same audio signal.

6. The sound producing control method according to claim 5, wherein, determining the corresponding sound producing unit when each audio signal of the at least one audio signals is outputted according to the image information includes:
identifying a sound producing object corresponding to each audio signal of the at least one audio signal in the image information;
determining a display position of the sound producing object in the image information on the display panel when the display panel is displaying the image information; and
determining the sound producing unit arranged at the display position to be used to output each audio signal of the at least one audio signal.

7. A method for determining signal filtering parameters, applied to the display device according to claim 1, wherein the method comprises:
reading measured spectrum data;
adjusting filtering parameters of the signal filter provided on the audio transmission line from the audio signal input end to each exciter of the at least two exciters in each sound producing unit of at least one sound producing unit according to the measured spectrum data, obtaining a set filtering parameter corresponding to the signal filter, so that through the set filtering parameter, when each exciter of the at least two exciters connected to the audio signal input end in the sound producing unit vibrates and produces sound in response to the same audio signal, low frequency compensation is implemented for the sound produced by the entire sound producing unit.

8. A sound producing control device, applied to the display device according to claim 1, the device comprises:
   a signal acquisition circuit, configured to acquire image information to be outputted and at least one audio signal corresponding to the image information;
   an analysis circuit, configured to determine a corresponding sound producing unit when each audio signal of the at least one audio signal is outputted according to the image information;
   a signal transmission circuit, configured to input each audio signal of the at least one audio signal to the audio signal input end of the corresponding sound producing unit, so that each exciter of the at least two exciters connected to the audio signal input end in the sound producing unit vibrates and produces sound in response to the same audio signal.

9. A device for determining signal filtering parameters, applied to the display device according to claim 1, the device comprises:
   a signal reading circuit, configured to read measured spectrum data;
   a data adjusting circuit, configured to adjust filtering parameters of the signal filter provided on the audio transmission line from the audio signal input end to each exciter of the at least two exciters in each sound producing unit of at least one sound producing unit according to the measured spectrum data, obtain a set filtering parameter corresponding to the signal filter, so that through the set filtering parameter, when each exciter of the at least two exciters connected to the audio signal input end in the sound producing unit vibrates and produces sound in response to the same audio signal, low frequency compensation is implemented for the sound produced by the entire sound producing unit.

10. A screen sound producing device, comprising:
   a plurality of sound producing units arranged in an array, each sound producing unit including at least two exciters;
   a circuit board, provided with a plurality of audio input ends, wherein each audio input end corresponds to one sound producing unit, and the audio input end is connected to each exciter of the corresponding sound producing unit through an audio transmission line; in each sound producing unit, a signal filter is provided on the audio transmission line from the audio input end to each exciter,
   wherein, the signal filter comprises a low-pass filter and a high-pass filter, in a same sound producing unit, the low-pass filter and the high-pass filter are provided on the audio transmission line from the audio signal input end to each exciter of the at least two exciters, and an audio signal at the audio signal input end passes through the low-pass filter to obtain a low frequency signal, passes through the high-pass filter to obtain a high frequency signal, and the low frequency signal and the high frequency signal are superimposed, normalized and then transmitted to each exciter of the at least two exciters, the each exciter of the at least two exciters vibrates and produces sound.

11. The screen sound producing device according to claim 10, wherein each sound producing unit further includes a plurality of display units arranged in an array, and each display unit is respectively provided with one exciter.

12. The screen sound producing device according to claim 10, wherein display units of the plurality of sound producing units are formed as one display panel, or one display unit is formed as one display sub-panel, and adjacent display sub-panels are spliced together.

13. The screen sound producing device according to claim 10, wherein
   the screen sound producing device further comprises a processor for inputting the audio signal to each audio input end.

* * * * *